United States Patent [19]
Rossi

[11] Patent Number: 4,833,025
[45] Date of Patent: May 23, 1989

[54] METHOD FOR APPLYING A REFRACTORY LAYER ON A SURFACE AND THE LAYER PRODUCED THEREBY

[75] Inventor: Nicholas J. Rossi, Littleton, Colo.

[73] Assignee: Manville Corporation, Denver, Colo.

[21] Appl. No.: 165,064

[22] Filed: Mar. 7, 1988

[51] Int. Cl.⁴ .............................................. B05D 1/12
[52] U.S. Cl. .................................. 428/357; 428/411.1; 428/688; 427/196; 427/397.7; 427/397.8; 427/426; 427/427; 427/419.2
[58] Field of Search ............ 427/196, 426, 427, 397.8, 427/397.7, 419.2; 428/411.1, 688, 357

[56] References Cited

U.S. PATENT DOCUMENTS

| | | | |
|---|---|---|---|
| 1,718,507 | 6/1929 | Wenzel et al. | 427/196 |
| 2,433,463 | 12/1947 | Lampe | 427/196 |
| 2,604,416 | 7/1952 | Dolbey | 427/213 |
| 2,842,897 | 7/1958 | Finn | 47/9 |
| 2,850,421 | 9/1958 | Thompson | 154/101 |
| 2,929,436 | 3/1960 | Hampshire | 154/1 |
| 3,107,057 | 10/1963 | Hanusch | 239/336 |
| 3,171,874 | 3/1965 | Rolle | 264/267 |
| 3,649,406 | 3/1972 | McNish | 427/427 X |
| 3,959,063 | 5/1976 | Hawthorne | 156/325 |
| 4,272,935 | 6/1981 | Lukas | 52/309.11 |
| 4,461,789 | 7/1984 | Takashima | 427/427 X |
| 4,492,766 | 1/1985 | Zuerina et al. | 501/104 |
| 4,547,403 | 10/1985 | Smith | 427/196 |
| 4,664,969 | 5/1987 | Rossi et al. | 428/284 |
| 4,673,594 | 6/1987 | Smith | 427/196 |
| 4,683,151 | 7/1987 | Hamaguchi et al. | 427/397.8 |
| 4,737,192 | 4/1988 | Smith | 106/85 |

FOREIGN PATENT DOCUMENTS 49-87723 8/1974 Japan .
51-40846 11/1976 Japan .
2093014 8/1982 United Kingdom .
2093015 8/1982 United Kingdom .

OTHER PUBLICATIONS

*Industrial Heating*, The Journal of Thermal Technology, Barrow, Apr. 1986, vol. III, No. 4, pp. 20–21.
Ceramospray ® Advertising by CAFCO and U.S. Mineral Company, Jan. 1984.

*Primary Examiner*—Shrive Beck
*Attorney, Agent, or Firm*—John D. Lister; Cornelius P. Quinn; Gregory A. Evearitt

[57] ABSTRACT

A process for applying an insulating bonded refractory fiber layer to a substrate such that the bonded refractory fiber will not delaminate form the substrate it is adhered to during thermal cycling. A pre-coat layer of refractory fiber coated with a binder containing potassium silicate, colloidal silica, kaolin clay, hydrated alumina, and optionally, Xanthan gum is applied to a substrate, preferably by spray application. Then a second insulating layer of refractory fiber coated with a binder containing either colloidal alumina, colloidal silica, colloidal zirconia, aluminum phosphates, or mixtures thereof is applied to the pre-coated substrate, preferably by spray application. Finally, the coated layers of bonded refactory fibers are cured. An article comprising a refractory layer bonded to a substrate produced by the foregoing process is also disclosed.

9 Claims, No Drawings

METHOD FOR APPLYING A REFRACTORY LAYER ON A SURFACE AND THE LAYER PRODUCED THEREBY

FIELD OF THE INVENTION

This invention relates to a method for applying a refractory layer to a surface and more particularly it relates to a process for applying a refractory layer to a surface where the binder for the refractory layer contains colloidal silica, colloidal alumina, colloidal zirconia, aluminum phosphates, or combinations thereof. This invention also relates to a refractory layer composed of fiber and binder produced by the process of this invention.

BACKGROUND OF THE INVENTION

Spray application of refractory fiber is a desirable method of producing a refractory material in furnaces, kilns, and other thermally insulated structures. Advantages of such a method include reduced costs and reduced downtime or the like. That is, as opposed to previous methods for relining furnaces, requiring either manual replacement of brick or mechanically attaching refractory fiber linings, spray insulation may be easily and quickly applied to the surfaces.

A number of spraying techniques or applications have been disclosed or known to those skilled in the art. While they have been satisfactory for their intended uses, these known methods have not been without limitations.

U.S. Pat. Nos. 4,547,403 and 4,673,594 both disclose the use of colloidal silica, colloidal alumina, colloidal zirconia, and aluminum phosphate as binders in conjunction with processes for spraying refractory fibers upon substrate surfaces. The limitation associated with these disclosed processes, though, is that the refractory layer sprayed upon a substrate surface may debond from that substrate upon thermal cycling. That is, while the process may result in bonding of the refractory fiber one to another, the bond between the fiber binder layer and the substrate upon which it is sprayed may be deficient. U.K. patent application Nos. 2,093,014 and 2,093,015 also disclose spraying applications utilizing phosphate bonding which would therefore suffer from the same limitations.

Thus, even though it is recognized that aluminum phosphates, colloidal silica, colloidal alumina, and colloidal zirconia are advantageous to use because of their economics and ready availability, attempts have been made to employ other binders in spraying processes because of the foregoing disclosed limitation. For example, one alternative method for applying refractory insulations utilizes refractory fibers and a hydraulic setting-inorganic binder. This product is marketed under the trademark CERAMOSPRAY ® which is a registered trademark of the U.S. Mineral Products Company. While suited for its intended purpose, this method utilizes a dry cementitious binder which is limited in its temperature range to a stated maximum of 2200° F. In addition, a cementitious binder such as calcium aluminate or calcium phosphate may adversely affect silicate based brick products at temperatures in excess of 2000° F., thus effectively reducing the maximum service temperatures of these cementitious refractory materials in such applications. Mechanical anchors are also required with this method. However, the installation of mechanical anchors is both labor and time intensive.

Still another spray application method is disclosed in Japanese Pat. Nos. 51-40846 and 49-87723. These references disclose the use of dry alumina cement the amount of which must be limited to avoid very high densities thereby affecting the thermal insulating properties of the layer. In addition, as stated in those references, when used in large quantities the scattering of cement dust creates an undesirable pollution problem. While the use of colloidal alumina is disclosed, it is only disclosed with a dry material such as bentonite to give it bonding characteristics. Such a system may suffer from weak bonding at the substrate interface.

Another sprayable ceramic fiber insulation system marketed under the trademark FIBERBRAX ®, a trademark of the Sohio Engineered Materials Company (CARBORUNDUM), is a sprayable system which is rated to a maximum temperature of 2100° F. While suited for its intended purpose, the system is limited in temperature application and is also a silica based binder material which is subject to debonding at the substrate interface as with the clay and phosphate binders. To improve the bonding of the layer to the substrate, mechanical anchors are recommended for many applications. As can be appreciated by one skilled in the art, the use of anchors increases cost and furnace down time. Anchors are also unsuitable for a badly deteriorated brick or other substrate since attachment of the anchors to the substrate may be difficult and/or dangerous.

U.S. Pat. No. 4,664,969 discloses a method for applying refractory fiber to a surface employing a liquid binder such as aluminum chloride which is capable of forming alpha alumina (Corundum) crystals upon curing. While suitable for its intended application, the disclosed process suffers from the limitation that upon curing of the binder, hydrogen chloride vapor can be released which can pose a stress-corrosion problem in some instances. For example, in petro-chemical plants where oil is typically piped through stainless steel tubes that are supported by stainless steel hangers, the HCl vapor is corrosive toward the stainless steel. Obviously, the consequences of possible failure due to stress-corrosion of the supporting stainless steel tubes could be great. The evolution of HCl vapor can also pose a potential health hazard to those working in the area.

From the foregoing, it can be seen that attempts to circumvent aluminum phosphate and colloidal refractory particle binding systems have not always resulted in superior processes. Therefore, what is needed in the industry is an application process which employs these binder systems but yet is economical, efficient, and easy to practice and which does not possess the foregoing disclosed limitations.

BRIEF SUMMARY OF THE INVENTION

The present invention is directed to a method for applying an insulating refractory material to a surface utilizing a liquid binder comprising colloidal alumina, colloidal silica, colloidal zirconia, aluminum phosphate, or combinations thereof and to the refractory layer produced thereby. Applicant has discovered that by applying a refractory pre-coat to the surface of a substrate prior to application of the insulating refractory layer, that the insulating refractory layer will be less susceptible to the problems associated with thermal cycling.

Briefly, Applicant's inventive process comprises the steps of: (a) directing a first stream of refractory fibers toward the surface of a substrate; (b) coating said first stream of refractory fibers with a liquid binder comprising about 25–35 wt% potassium silicate; 10–50 wt% colloidal silica; 4–8 wt% kaolin clay; and 2–6 wt% hydrated alumina; and optionally, 0.3–0.8 wt% Xanthan gum during the step of directing such that the refractory fibers adhere to one another and to the surface; (c) directing a second stream of refractory fibers toward the refractory pre-coated substrate; (d) coating the second stream of refractory fibers with a liquid binder comprising at least one material selected from the group consisting of colloidal silica, colloidal alumina, colloidal zirconia, and aluminum phosphates during the step of directing such that the refractory fibers adhere to one another and to the pre-coated substrate, and (e) thereafter, curing the coated fibers.

By applying the pre-coat containing refractory fiber bonded together with potassium silicate, colloidal silica, kaolin clay, and hydrated alumina, the difficulties associated with the repeated differential thermal expansion and contraction of the subsequently applied insulating refractory fiber layer during thermal cycling are greatly reduced and minimized. Furthermore, curing of either the pre-coat (first) layer or insulating (second) layer presents no potential health or stress-corrosion problems.

Other features and aspects, as well as the various benefits, of the present invention will be made clear in the more detailed description which follows.

DETAILED DESCRIPTION OF THE INVENTION

In the first step of Applicant's inventive process, the surface of a substrate is pre-coated with a refractory fiber layer utilizing liquid binder comprising the following ingredients at the indicated weight percentage levels based upon the total weight of the liquid binder.

| Ingredient | General | Preferred | Most Preferred |
| --- | --- | --- | --- |
| Potassium Silicate (Solids) | 25–35 | 29–31 | 30 |
| Colloidal Silica (Solids) | 10–50 | 14–16 | 15 |
| Kaolin Clay | 4–8 | 5–7 | 6 |
| Hydrated Alumina | 2–6 | 3–5 | 4 |
| Xanthan Gum |  | 0.3–0.8 | 0.3 |

Although not required, the use of a Xanthan gum is preferred in order to both improve the dispersion of alumina and clay in the binder mix and to provide greater cohesiveness to the refractory fibers.

The balance of the liquid binder will comprise water.

The refractory fiber pre-coat layer will preferably be applied to the surface of the substrate as a spray. The substrate may be a bare metal wall of a furnace or it could be a brick substrate. It should be appreciated that the present invention may also be utilized with any substrate such as refractory castables or other materials as are known in the art. Similarly, the substrate may be refractory fiber modules which have been mechanically attached as is known in the art.

A spraying apparatus is used from which a stream of binder coated refractory fiber is directed toward the surface of the substrate. As used herein, refractory fibers are defined as inorganic, amorphous, or crystalline fibers which are not adversely affected by temperature in excess of 1500° F. Examples of such fiber are ceramic fibers such as alumina-silica-zirconia, alumina-silica, and other fibers as are known in the art. Preferably, the fiber will be blown by air pressure from a suitable pneumatic apparatus.

It is preferable that the weight ratio of fiber to binder be about 1:1.

Preferably, the refractory fiber pre-coat layer will have a thickness of from about ¾ to 1½ inches, most preferably about ¾ to 1 inch.

In a preferred embodiment of the present invention, the substrate may be pre-wetted with the foregoing disclosed liquid binder solution.

After the pre-coat layer is applied to the surface of the substrate, a thicker second insulating layer of a bonded refractory fiber is applied. This is also done preferably in a spraying process conducted as previously disclosed.

The liquid binder employed in this second application step will comprise at least one refractory material selected from the group consisting of colloidal alumina, colloidal silica, colloidal zirconia, aluminum phosphates, or mixtures thereof. Preferably, the liquid binder solution will comprise at least about 10% by weight (solids) of the foregoing. Other materials such as kaolin clay and hydrated alumina may optionally be employed in the liquid binder. The balance of the liquid binder will comprise water.

Preferably, the weight ratio of fiber to binder in this second application step will be approximately 1:1.

The thickness of the second layer will preferably be from about 2½ to 4 inches and most preferably from about 2½ to 3½ inches.

After application of the second insulating layer, the coated fibers are cured, preferably at a temperature in the range of about 230° to 220° F., most preferably at about 230° to 1000° F.

The following non-limiting examples further illustrate the present invention.

Example 1

An experimental panel was constructed out of dense refractory brick. The panel measured 3'×3'×4'. The surface was pre-wetted with a solution of 30 wt% by weight potassium silicate, 15 wt% colloidal silica, 6 wt% kaolin clay, 4 wt% hydrated alumina, 0.3 wt% Xanthan Gum, and the balance water. Afterwards, while simultaneously blowing the refractory fiber with the same solution, the panel was coated to approximately ¾ to 1 inch thick.

A second (insulating) layer of refractory fiber was then applied by simultaneously blowing refractory fiber with a second liquid solution containing colloidal silica, kaolin clay, hydrated alumina, and water. The second layer was sprayed to a thickness of 2.5 inches. Thus, the total thickness of the panel was 3.5 inches.

The panel was vertically positioned on the open side of a gas fired hearth and the hearth was brought up to a temperature of 2250° for 8 hours. After this time the hearth was shutdown and allowed to cool for 16 hours. This same regimen of heat and cooling continued for 20 cycles after which the panel was examined and revealed no signs of delamination from the brick.

Example 2

Approximately 15 square feet of a dense brick roof was pre-wetted with a potassium silicate-colloidal silica binder solution (same as used in Example 1) and then sprayed with a stream of refractory fibers coated with the binder to an approximate thickness of 1 inch. The same substrate was then sprayed with colloidal silica/refractory fiber to a desired thickness of 2.5 inches on top of the previous area. The total thickness was approximately 3.5 inches. The furnace was heated to 2400° F. for 8 hours and afterwards, was shutdown for 16 hours. This heating/cooling cycling continued for 3.5 months, after which the roof was examined and showed no sign of delamination from the brick.

Reasonable modifications and variations are possible from the foregoing disclosure without departing from the spirit or scope of the present invention as defined in the claims.

What is claimed is:

1. A process for producing a refractory layer on a substrate comprising in order the steps of:
   (a) directing a first stream of refractory fibers toward the surface of a substrate;
   (b) coating said first stream of refractory fibers with a liquid binder comprising about 25-35 wt% potassium silicate; 10-50 wt% colloidal silica; 4-8 wt% kaolin clay; and 2-6 wt% hydrated alumina during said step of directing such that said refractory fibers adhere to to another and to said surface;
   (c) directing a second stream of refractory fibers toward the refractory pre-coated substrate;
   (d) coating said second stream of refractory fibers with a liquid binder comprising at least one material selected from the group consisting of colloidal silica, colloidal alumina, colloidal zirconia, and aluminum phosphates during the step of directing such that the refractory fibers adhere to one another and to the pre-coated surface; and thereafter
   (e) curing the layers of coated fibers.

2. A process according to claim 1 further comprising the step of, prior to said step of directing fibers in 1(a), coating said surface to be sprayed with said liquid binder comprising potassium silicate; colloidal silica; kaolin clay; and hydrated alumina.

3. A process according to claim 1 wherein said liquid binder of 1(a) comprises about 29-31 wt% potassium silicate; 14-16 wt% colloidal silica; 5-7 wt% kaolin clay; 3-5 wt% hydrated alumina; and 0.3-0.8 wt% Xanthan Gum.

4. A process according to claim 1 wherein said liquid binder of 1(a) comprises about 30 wt% potassium silicate; 15 wt% colloidal silica; 6 wt% kaolin clay; and 4 wt% hydrated alumina; and 0.3 wt% Xanthan Gum.

5. A process according to claim 1 wherein the weight ratio of fiber to binder in 1(b) is about 1:1.

6. A process according to claim 1 wherein the pre-coat layer produced in 1(b) has a thickness of about $\frac{3}{4}$ to 1 inch.

7. A process according to claim 1 wherein the weight ratio of fiber to binder in 1(d) is about 1:1.

8. A process according to claim 1 wherein the refractory fiber layer produced in 1(d) has a thickness of about $2\frac{1}{2}$ to $3\frac{1}{2}$ inches.

9. An article comprising a refractory layer bonded to a substrate according to the process of claim 1.

* * * * *